(12) United States Patent
Nakagawa et al.

(10) Patent No.: US 11,487,593 B2
(45) Date of Patent: Nov. 1, 2022

(54) BARRIER SYNCHRONIZATION SYSTEM AND PARALLEL INFORMATION PROCESSING APPARATUS

(71) Applicant: FUJITSU LIMITED, Kawasaki (JP)

(72) Inventors: Kanae Nakagawa, Sagamihara (JP); Masaki Arai, Kawasaki (JP); Yasumoto Tomita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 231 days.

(21) Appl. No.: 17/013,897

(22) Filed: Sep. 8, 2020

(65) Prior Publication Data

US 2021/0073049 A1 Mar. 11, 2021

(30) Foreign Application Priority Data

Sep. 11, 2019 (JP) .............................. JP2019-165751

(51) Int. Cl.
*G06F 9/46* (2006.01)
*G06F 9/52* (2006.01)
(Continued)

(52) U.S. Cl.
CPC .............. *G06F 9/522* (2013.01); *G06F 9/485* (2013.01); *G06F 16/2246* (2019.01); *H04L 12/44* (2013.01); *H04L 67/1095* (2013.01)

(58) Field of Classification Search
CPC ...... G06F 9/522; G06F 9/485; G06F 16/2246; H04L 12/44; H04L 67/1095
See application file for complete search history.

(56) References Cited

U.S. PATENT DOCUMENTS 6,286,095 B1 * 9/2001 Morris .................. G06F 9/3834
712/216
7,155,588 B1 * 12/2006 Jeter, Jr. ................. G06F 9/522
711/163

(Continued)

FOREIGN PATENT DOCUMENTS

| JP | 2014-063278 A | 4/2014 |
| JP | 2016-62388 A | 4/2016 |
| JP | 2017-16250 A | 1/2017 |

OTHER PUBLICATIONS

Extended European Search Report dated Feb. 15, 2021 for corresponding European Patent Application No. 20195026.8, 13 pages.

*Primary Examiner* — Adam Lee
(74) *Attorney, Agent, or Firm* — Fujitsu Patent Center

(57) ABSTRACT

A barrier synchronization system, a parallel information processing apparatus, and the like are described in the embodiments. In an example, provided is a solution to reduce latency time and improve processing speed in barrier synchronization. The parallel information processing apparatus includes: a completion information storage configured to store completion information, wherein the completion information includes information relating to completion of processing of an own apparatus and information relating to completion of processing of a lower information processing apparatus located in the tree structure; and a control circuit configured to, in response to a determination result indicating that a current status amounts to a given condition, instruct a specified information processing apparatus to forcibly suspend processing, the specified information processing apparatus being an apparatus that has not yet completed processing before all of the plurality of information processing apparatuses have completed the processing.

12 Claims, 14 Drawing Sheets

(51) Int. Cl.
  *G06F 16/22*    (2019.01)
  *G06F 9/48*     (2006.01)
  *H04L 12/44*    (2006.01)
  *H04L 67/1095*  (2022.01)

(56) References Cited

U.S. PATENT DOCUMENTS

| | | | |
|---|---|---|---|
| 10,733,165 B1* | 8/2020 | Broad | G06F 16/2246 |
| 2009/0300385 A1* | 12/2009 | Archer | G06F 9/52 |
| | | | 713/320 |
| 2014/0007111 A1 | 1/2014 | Targowski | |
| 2017/0357705 A1* | 12/2017 | Mendez Lojo | G06F 16/275 |

* cited by examiner

FIG. 5

```
MPI_Comm_rank (comm, &my_rank) ;
...
MPI_Barrier (comm) ;
set_AC_parameter (m, c) ;
start_AC_region (mode) ;
...
...
MPI_Barrier (comm) ;
end_AC_region (mode) ;
If (my_rank == 0 && mode == 2) {
  get_AC_value (&S, &M, &E) ;
}
```

BARRIER SYNCHRONIZATION SYSTEM AND PARALLEL INFORMATION PROCESSING APPARATUS

CROSS-REFERENCE TO RELATED APPLICATION

This application is based upon and claims the benefit of priority of the prior Japanese Patent Application No. 2019-165751, filed on Sep. 11, 2019, the entire contents of which are incorporated herein by reference.

FIELD

The embodiment discussed herein is related to a barrier synchronization system, a parallel information processing apparatus, and a non-transitory computer-readable storage medium for storing a barrier synchronization program.

BACKGROUND

In a parallel processing system in which a plurality of processing units are processed in parallel by a plurality of information processing apparatuses, there is barrier synchronization as a method of synchronizing the plurality of processing units. Here, the processing unit is a unit of using the information processing apparatus, and is, for example, a process.

FIG. 13 is a diagram for describing barrier synchronization. FIG. 13, the process #1 to the process #n perform i-th processing in parallel, and the process #n completes the latest processing. As illustrated in FIG. 13, in the barrier synchronization, the processes other than the latest process #n wait until the process #n completes the i-th processing, and when the process #n completes the i-th processing, the process #1 to the process #n start (i+1)-th processing.

FIG. 14 is a diagram for describing communication between information processing apparatuses in the barrier synchronization. In FIG. 14, a node denoted by P is an information processing apparatus on which a process for performing barrier synchronization operates. As illustrated in FIG. 14, the information processing apparatus on which a process for performing barrier synchronization operates forms a binary tree. The information processing apparatus at a lowermost layer in the binary tree transmits a completion notification to a master information processing apparatus as illustrated by a solid line when itself completes the processing of the process. The information processing apparatuses at a second layer or higher transmit the completion notifications to the master information processing apparatus as illustrated by a solid line when the completion notifications of all the lower information processing apparatuses are available, and itself completes the processing of the process.

The information processing apparatus at an uppermost level receives the completion notification from all the lower information processing apparatuses, and itself completes the processing of the process, it is determined that all the information processing apparatuses are completed the processing of the process, and all the lower information processing apparatuses are notified that the processing is completed as illustrated by the broken line. The information processing apparatus notified that the processing is completed starts next processing.

Note that, as a technique of related art, there is a synchronization processing circuit that performs synchronization processing of a portion or all of a plurality of processing means by using a plurality of nodes having tree structures. The node having the tree structure includes a plurality of leaf nodes located at the lowermost level and respectively corresponding to the plurality of processing means, a root node located at the uppermost level, and a plurality of internal nodes other than the root node and the leaf node. In this tree structure, not only a logical value is notified from a slave node to a master node, but also a logical value is notified from the master node to the slave node. Each internal node is provided with an internal node selection unit that selects whether to notify the master node of a logical value obtained by performing a logical operation on a logical value notified from the slave node of the internal node or to notify the master rode of negation of the logical value notified from the master node.

Examples of the related art include Japanese Laid-open Patent Publication No. 2014-63278.

SUMMARY

According to an aspect of the embodiments, provided is a barrier synchronization system including: a plurality of information processing apparatuses configured to perform parallel processing while synchronizing by barrier synchronization, each information processing apparatus being configured to be one of a plurality of nodes in a tree structure and being associated with one or more of other nodes from among the plurality of nodes. In an example, each of the plurality of information processing apparatuses includes: a completion information storage; and a control circuit, wherein the completion information storage of a respective information processing apparatus is configured to store completion information including information relating to completion of processing of an own apparatus being the respective information processing apparatus, the completion information further including information relating to completion of processing of a lower information processing apparatus in case that the own apparatus is associated with the lower information processing apparatus, the lower information processing apparatus being one of the plurality of information processing apparatuses and being operated as a node lower than the own apparatus in the tree structure, wherein the control circuit of the respective information processing apparatus is configured to: when the respective information processing apparatus is configured to be operated as a root node located in a root in the tree structure, obtain a current status of parallel processing in the plurality of nodes by using the completion information storage; determine whether the obtained current status of the parallel processing amounts to a given condition; in response to a determination result indicating that the obtained current status of the parallel processing amounts to the given condition, specify an information processing apparatus from among the plurality of information processing apparatuses by using the completion information storage, the specified information processing apparatus being an apparatus that has not yet completed the processing; and instruct the specified information processing apparatus to forcibly suspend the processing before all of the plurality of information processing apparatuses have completed the processing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a program designating the AC parallelization;

DESCRIPTION OF EMBODIMENT(S)

In the barrier synchronization, there may be a difference in processing time between the processes, and thus there is a circumstance that a process in which processing is first completed may wait until processing of all the processes is completed.

According to one aspect of the present invention, provided is a solution to reduce latency time and improve processing speed in barrier synchronization.

Hereinafter, an example of a barrier synchronization system, a method for barrier synchronization, and a parallel information processing apparatus disclosed in the present application will be described in detail with reference to the drawings. Note that, the example does not limit the techniques disclosed herein.

EXAMPLE

Figure 1:
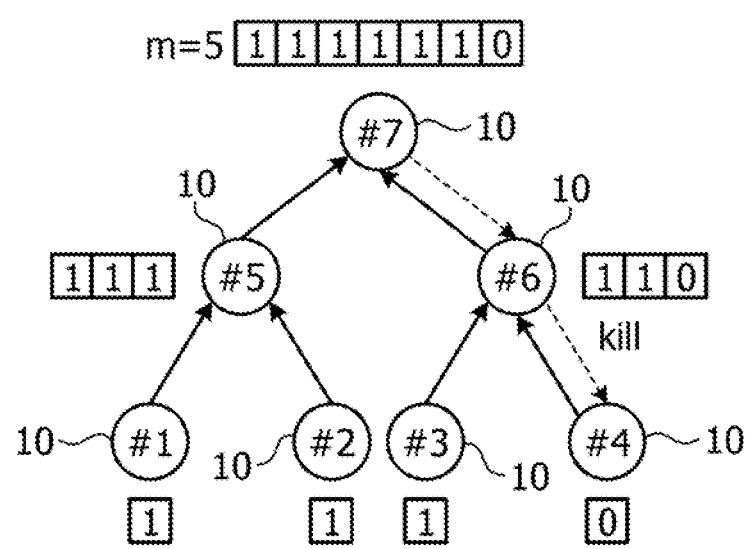
FIG. 1 is a diagram for describing AC parallelization by a parallel processing system according to an example.

First, approximate computing (AC) parallelization by a parallel processing system according to the example will be described. FIG. 1 is a diagram for describing the AC parallelization by the parallel processing system according to the example. In FIG. 1, a node 10 at a binary tree is an information processing apparatus that performs parallel processing. The number in the node 10 is a number for identifying the node 10. The number of nodes 10 is 7.

The processing status of each node 10 is represented by bit information of 1 bit. The bit information "1" indicates that processing is completed, and the bit information "0" indicates that processing is not completed. Each node 10 has a bit vector indicating a processing status in itself and nodes 10 lower than itself. A root node 10 has a bit vector holding bit information of all nodes 10.

In FIG. 1, each of node #1, node #2, node #3, and node #4 has a bit vector of 1 bit. The bit vector of each of node #1, node #2, and node #3 is (1) indicating that itself completes the processing. The bit vector of node #4 is (0) indicating that itself does not complete the processing.

Each of node #5 and node #6 has a bit vector of 3 bits. The bit vector of node #5 is (1, 1, 1) indicating that itself, node #1, and node #2 complete the processing. The bit vector of node #6 is (1, 1, 0) indicating that itself and node #3 complete the processing, and node #4 does not complete the processing.

Node #7 has a bit vector of 7 bits. The bit vector of node #7 is (1, 1, 1, 1, 1, 1, 0) indicating that its own node 10, node #5, node #1, node #2, node #6, and node #3 complete the processing, and node #4 does not complete the processing.

When the processing is completed, the node 10 at a lowermost layer in the binary tree sets 1 to the bit vector and transmits a completion notification to the master node 10 as illustrated by a solid line. In FIG. 1, when the processing is completed, node #1 and node #2 set 1 to the bit vector and transmit a completion notification to node #5. When the processing is completed, node #3 and node #4 set 1 to the bit vector and transmit a completion notification to node #6.

When the processing is completed, the node 10 at the second layer or higher sets 1 to the corresponding bit vector and transmits a completion notification to the master node 10 when the master node 10 is present as illustrated by a solid-line arrow. In addition, when receiving the completion notification of one of the lower nodes 10 from the slave node 10, the node 10 at the second layer or higher sets the corresponding bit vector to 1 and transfers the received completion notification to the master node 10 when the master node 10 is present.

In FIG. 1, when the processing is completed, node #5 sets the bit corresponding to node #5 of the bit vector to 1 and transmits a completion notification to node #7. In addition, when receiving the completion notification from node #1 or node #2, node #5 sets the bit corresponding to node #1 or node #2 of the bit vector to 1 and transfers the received completion notification to node #7.

When the processing is completed, node #6 sets the bit corresponding to node #6 of the bit vector to 1 and transmits a completion notification to node #7. In addition, when receiving the completion notification from node #3 or node #4, node #6 sets the bit corresponding to node #3 or node #4 of the bit vector to 1 and transfers the received completion notification to node #7.

When the processing is completed, node #7 sets the bit corresponding to node #7 of the bit vector to 1.

When the number of 1 of the bit vector is m or greater, the root node 10 transmits a forcible suspension (kill) notification to the node 10 in which processing is not completed along the binary tree as illustrated by a broken-line arrow. In other words, when the number of 1 of the bit vector is m or greater, the root node 10 transmits the forcible suspension notification to the slave node 10 including the node 10 in which processing is not completed on the node 10 under management. Here, the node 10 under management is a node 10 included in a partial binary tree having the own node 10 as the root. The slave node 10 receiving the forcible suspension notification suspends the processing when the processing is not completed and transmits the forcible suspension notification to the slave nodes 10 including the node 10 in which processing is not completed on the node 10 under management.

In FIG. 1, m is 5. Since the number of 1 of the bit vector is 5 or more, node #7 transmits a forcible suspension notification to the nodes #6 including node #4 in which processing is not completed on the node 10 under management. Node #6 transfers the forcible suspension notification to node #4 including node #4 in which processing is not completed on the node 10 under management.

As described above, in an AC parallelization according to the example, when the number of 1 of the bit vector is m or greater, the root node 10 transmits the forcible suspension notification to the node 10 in which processing is not completed along the binary tree. Therefore, the parallel processing system according to the example may reduce the latency time and improve the processing speed in the barrier synchronization.

Figure 2:
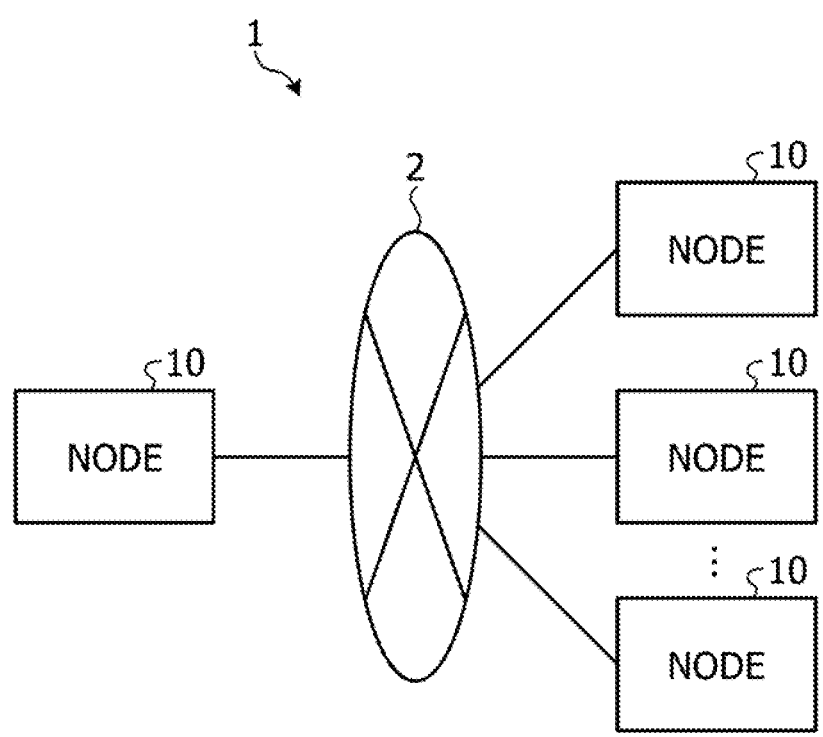
FIG. 2 illustrates a configuration of the parallel processing system according to the example.

Next, a configuration of the parallel processing system according to the example is described below. FIG. 2 illustrates a configuration of the parallel processing system according to the example. As illustrated in FIG. 2, the parallel processing system 1 according to the example includes a plurality of nodes 10. The plurality of nodes 10 are coupled to a network 2. Each node 10 performs communication for barrier synchronization with the node 10 connected in the binary tree via the network 2.

Figure 3:
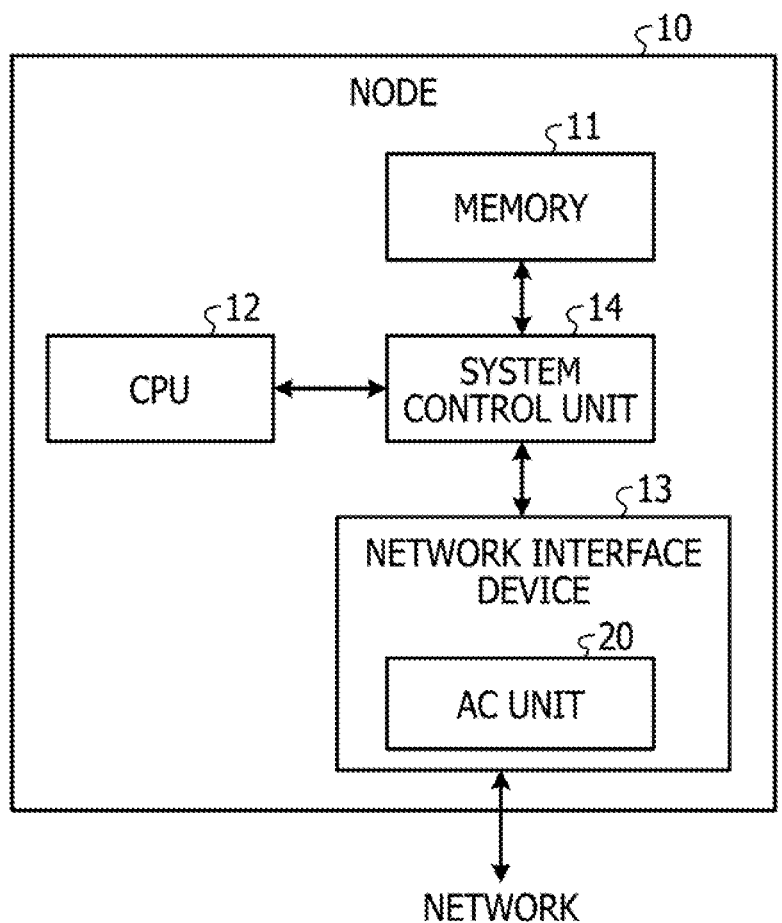
FIG. 3 illustrates a configuration of a node.

FIG. 3 illustrates a configuration of the node 10. As illustrated in FIG. 3, the node 10 includes a memory 11, a central processing unit (CPU) 12, a network interface device 13, and a system control unit 14.

The memory 11 is a random-access memory (RAM) that stores a program and a result during execution of the program. The CPU 12 is a central processing unit for reading the program from the memory 11 and executing the program.

The network interface device 13 communicates with another node 10 via the network 2. The network interface device 13 includes an AC unit 20. The AC unit 20 performs processing related to barrier synchronization.

The system control unit 14 controls the entire node 10. For example, the system control unit 14 exchanges data and notifications between the memory 11 and the CPU 12 or between the CPU 12 and the network interface device 13.

Figure 4:
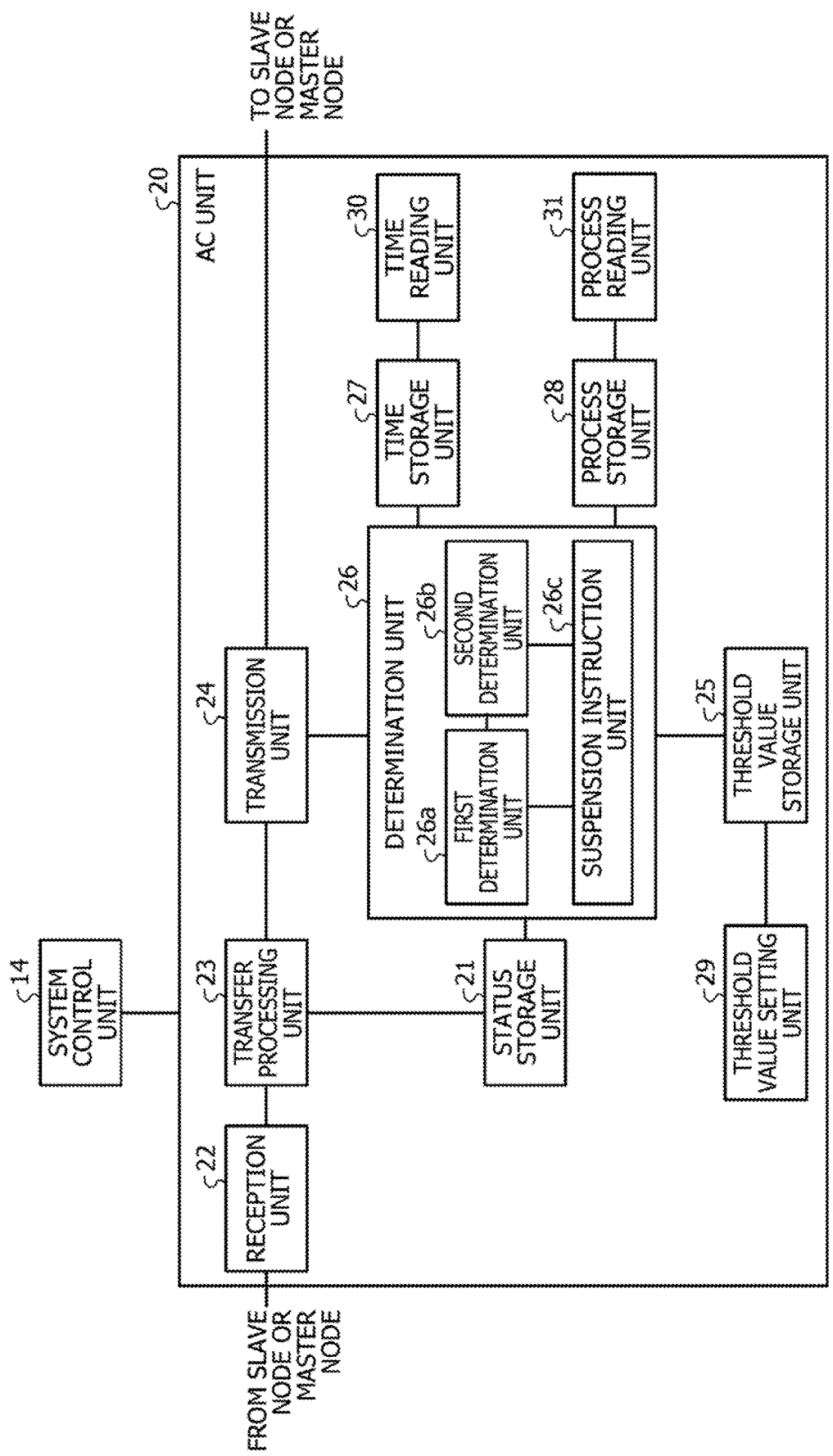
FIG. 4 illustrates a functional configuration of an AC unit.

FIG. 4 illustrates a functional configuration of the AC unit 20. As illustrated in FIG. 4, the AC unit 20 includes a status storage unit 21, a reception unit 22, a transfer processing unit 23, a transmission unit 24, a threshold value storage unit 25, a determination unit 26, a time storage unit 27, a process storage unit 28, a threshold value setting unit 29, a time reading unit 30, and a process reading unit 31.

The status storage unit 21 stores a bit vector. The reception unit 22 receives the completion notification and the identification number from the slave node 10 when the slave node 10 is present and receives the forcible suspension notification from the master node 10 when the master node 10 is present. Here, the identification number is a number for identifying the node 10. Then, the reception unit 22 passes the received completion notification, the identification number, and the forcible suspension notification to the transfer processing unit 23.

When the transfer processing unit 23 is notified that the processing of the own node 10 is completed from the system control unit 14, the transfer processing unit 23 sets the bit corresponding to the own node 10 of the bit vector to 1, and transmits a completion notification and the identification number of the own node 10 to the master node 10 when the master node 10 is present. The transfer processing unit 23 transmits the completion notification and the identification number via the transmission unit 24.

When receiving the completion notification and the identification number from the reception unit 22, the transfer processing unit 23 sets the bit corresponding to the identification number of the bit vector to 1 and transfers the completion notification and the identification number to the master node 10 via the transmission unit 24 when the master node 10 is present.

When receiving the forcible suspension notification from the reception unit 22, the transfer processing unit 23 refers to the bit vector and instructs the system control unit 14 to suspend the processing when the own node 10 does not complete the processing. In addition, when receiving the forcible suspension notification from the reception unit 22, the transfer processing unit 23 refers to the bit vector and transfers the forcible suspension notification to the slave nodes 10 including the node 10 in which processing is not completed on the node 10 under management via the transmission unit 24. When transferring the forcible suspension notification, the transfer processing unit 23 designates the identification number of the slave node 10 of a transfer destination to the transmission unit 24.

The transmission unit 24 transmits the completion notification received from the transfer processing unit 23 to the master node 10, and transmits the forcible suspension notification to the slave node 10 whose identification number is designated by the transfer processing unit 23. In addition, when the own node 10 is the root node 10, the transmission unit 24 transmits a forcible suspension notification to the slave node 10 based on an instruction from the determination unit 26.

When the own node 10 is the root node 10, the threshold value storage unit 25 stores a threshold value m and a threshold value c (c is a positive integer). The threshold value m and the threshold value c are used by the determination unit 26.

When the own node 10 is the root node 10, the determination unit 26 performs processing based on the mode designated by the program. When the mode is 0, the determination unit 26 performs normal barrier synchronizations In other words, when all the bits of the bit vector are 1, the determination unit 26 completes synchronization between processes.

When the mode is 1, the determination unit 26 performs AC parallelization. In other words, the determination unit 26 determines whether or not the number of 1 of the bit vector is the threshold value in or greater, determines that the synchronization condition is satisfied when the number of 1 of the bit vector is the threshold value m or greater, and forcibly suspends the processing in which processing is not completed.

In addition, when one of the bits of the bit vector first is 1, the determination unit 26 stores a current time in S. Note that, here, the time is a count number counted by a counter. S is a register, for example. Then, when the current time is (S+threshold value c) or longer, the determination unit 26 determines that the synchronization condition is satisfied, and forcibly suspends the process in which processing is not completed.

In addition, the determination unit 26 stores, in the process storage unit 28, the number of the process operating in the node 10 instructed the forcible suspension in association with the number of times of the barrier synchronization, For example, the determination unit 26 specifies the process number from the bit vector by storing the process number notified from each node 10 in association with the node 10.

When the mode is 2, the determination unit 26 collects data on AC parallelization. The determination unit 26 collects a time s at which one of the bits of the bit vector first is 1, a time $m_t$ at which the number of 1 of the bit vector is a threshold value m or greater, and a time e at which all bits of the bit vector are 1. The collected time s, time $m_t$, and time e are retrieved by a program, for example.

The determination unit 26 includes a first determination unit 26a, a second determination unit 26b, and a suspension instruction unit 26c. When the mode is 1, the first determination unit 26a determines whether or not the number of 1 of the bit vector is the threshold value m or greater, and when the number is the threshold value m or greater, the first determination unit 26a instructs the suspension instruction unit 26c to forcibly suspend the process in which processing is not completed.

When the mode is 1, the second determination unit 26b stores the current time in S when one of the bits of the bit vector first is 1. Then, the second determination unit 26b determines whether or not the current time is (S+threshold value c) or longer, and when the current time is (S+threshold value c) or longer, the second determination unit 26b instructs the suspension instruction unit 26c to forcibly suspend the process in which processing is not completed.

When the mode is 1, and the first determination unit 26a or the second determination unit 26b instructs to forcibly suspend the process in which processing is not completed, the suspension instruction unit 26c specifies the node 10 in which processing is not completed based on the bit vector. Then, when the specified node 10 includes the own node 10, the suspension instruction unit 26c instructs the system control unit 14 to forcibly suspend the processing.

In addition, when the specified node 10 includes another node 10, the suspension instruction unit 26c transmits a forcible suspension notification to the slave node 10 including the specified node 10 under management. In the slave node 10 to which the forcible suspension notification is transmitted, the forcible suspension notification is processed by the transfer processing unit 23. The suspension instruction unit 26c transmits a forcible suspension notification via the transmission unit 24.

Note that, the suspension instruction unit 26c may pass an estimated value of the processing result to the system control unit 14 and the instruction of the forcible suspension. In addition, the suspension instruction unit 26c may transmit the estimated value of the processing result and the instruction of the forcible suspension to the slave node 10 including the node 10 in which processing is not completed on the node 10 under management. For example, the AC unit 20 stores past execution results and an average value of the execution results, and the suspension instruction unit 26c transmits the average value of the past execution results as the estimated value.

When the own node 10 is the root node 10, the time storage unit 27 stores the time s, the time $m_t$, and the time e collected by the determination unit 26. When the own node 10 is the root node 10, the process storage unit 28 stores the number of the process instructed to be forcibly suspended in association with the number of times of barrier synchronization.

When the own node 10 is the root node 10, the threshold value setting unit 29 stores the threshold value m and the threshold value c on the threshold value storage unit 25. The threshold value m and the threshold value c are designated by a program. The threshold value setting unit 29 receives the threshold value m and the threshold value c designated by the program from the CPU 12 via the system control unit 14.

When the own node 10 is the root node 10, the time reading unit 30 reads the time s, the time $m_t$, and the time e from the time storage unit 27 and transmits these times to the CPU 12 via the system control unit 14. When the own node 10 is the root node 10, the process reading unit 31 reads the process number associated with the number of times of barrier synchronization from the process storage unit 28 and transmits the process number to the CPU 12 via the system control unit 14.

FIG. 5 illustrates an example of a program designating the AC parallelization. As illustrated in FIG. 5, a threshold value m and a threshold value c are designated by "set_AC_parameter (m, c)". In addition, a location and mode of AC parallelization are designated by "start_AC_region (mode)" and "end_AC_region (mode)". In addition, the time s, the time $m_t$, and the time e are acquired by "get_AC_value (&S, &M, &E)".

In addition, the threshold value m and the threshold value c are passed to the threshold value setting unit 29 of the root node 10 by "set_AC_parameter (m, c)". In addition, the mode is passed to the determination unit 26 of the root node 10 by "start AC region (mode)" the bit vector of each node 10 is cleared to 0, and the time is reset.

Figure 6:
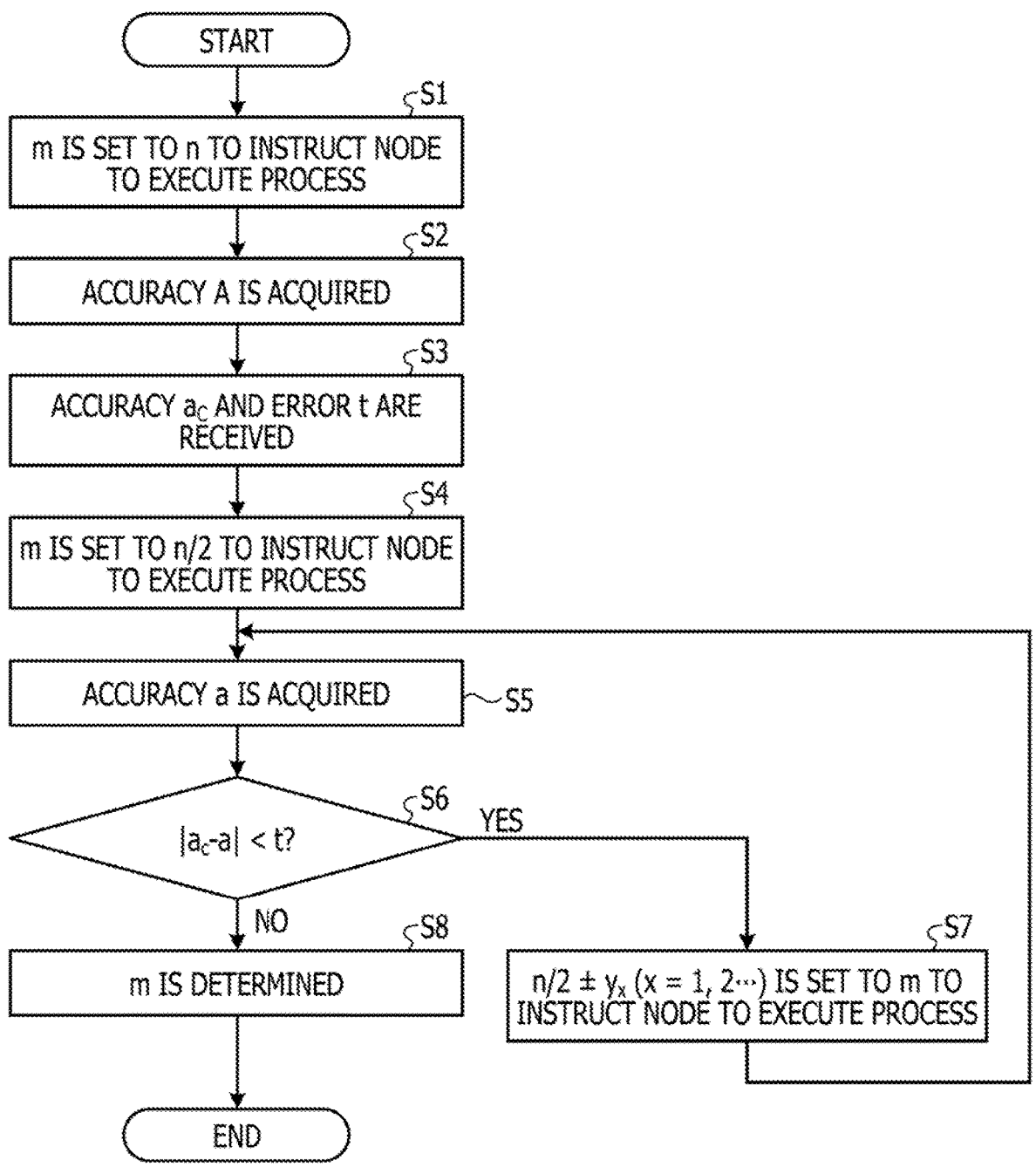
FIG. 6 is a flowchart illustrating a flow of processing for determining a threshold value m.

Note that, instead of designating the threshold value m and the threshold value c by the program, the threshold value setting unit 29 may determine the threshold value m and the threshold value c. FIG. 6 is a flowchart illustrating a flow of processing for determining a threshold value m.

As illustrated in FIG. 6, the threshold value setting unit 29 sets n to m, instructs the node 10 to execute a process (Step S1) and acquires an accuracy A (Step S2). Then, the threshold value setting unit 29 receives an accuracy $a_c$ and an error t (Step S3), Here, $a_c$ is a required accuracy and $a_c$<A. In addition, t is an error with $a_c$ and is an error capable of securing required accuracy. Then, the threshold value setting unit 29 sets n/2 to m, instructs the node 10 to execute the process (Step S4) and acquires an accuracy a (Step S5).

Then, the threshold value setting unit 29 determines whether or not the absolute value of the difference between $a_c$ and a is smaller than t (Step S6). When the absolute value is smaller, the threshold value setting unit 29 sets a value obtained by adding $y_x$ to n/2 or a value obtained by subtracting $y_x$ from n/2 to m and instructs the node 10 to execute the process (Step S7). Here, x is the number of times Step S7 is executed. In addition, $y_x$ is $n/2^{x+1}$. For example, $y_1$ is $(n-m)/2=n/2^2$, and $y_2$ is $n/2^3$. In addition, the threshold value setting unit 29 sets a value obtained by adding $y_x$ to n/2 to m when a≥$a_c$, and sets a value obtained by subtracting $y_x$ from n/2 to m when a<$a_c$. Then, the threshold value setting unit 29 returns to Step S5.

On the other hand, when the absolute value of the difference between $a_c$ and a is not smaller than t, the threshold value setting unit 29 determines m with a current value (Step S8).

As described above, since the threshold value setting unit 29 determines the threshold value m, the AC unit 20 may optimize the AC parallelization function. Note that, the processing illustrated in FIG. 6 may be performed by an external device of the AC unit 20, and the AC unit 20 may receive the threshold value m determined by the external device.

Figure 7:
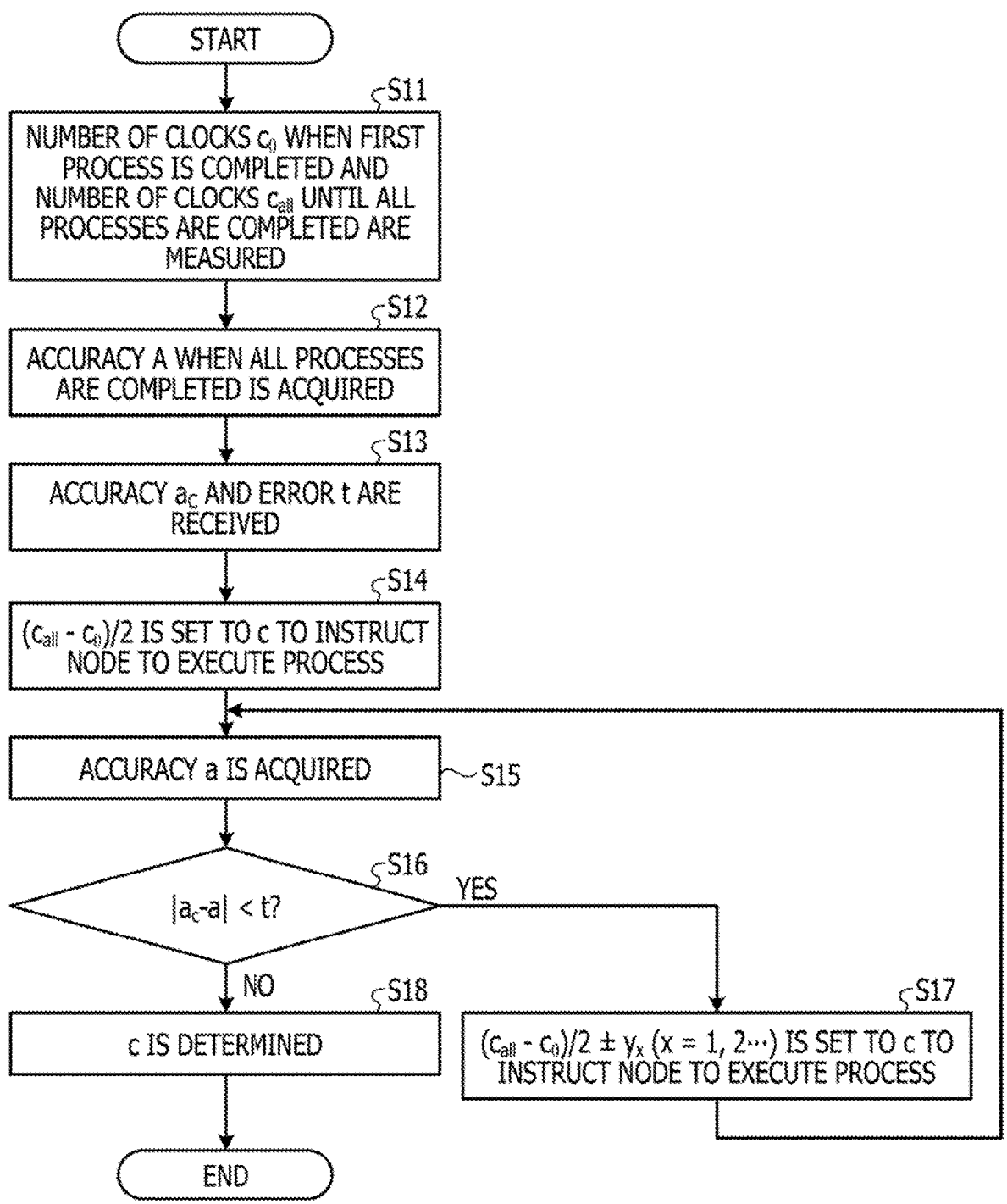
FIG. 7 is a flowchart illustrating a flow of processing for determining a threshold value c.

FIG. 7 is a flowchart illustrating a flow of processing for determining a threshold value c. As illustrated in FIG. 7, the threshold value setting unit 29 measures the number of clocks $c_0$ when the first process is completed and the number of clocks $c_{all}$ when all processes are completed (Step S11) and acquires the accuracy A when all processes are completed (Step S12). Then, the threshold value setting unit 29 receives the accuracy $a_c$ and the error t (Step S13). Then, the threshold value setting unit 29 sets $(c_{all}-c_0)/2$ to c, instructs the node 10 to execute the process (Step S14) and acquires an accuracy a (Step S15).

Then, the threshold value setting unit 29 determines whether or not the absolute value of the difference between $a_c$ and a is smaller than t (Step S16). Then, when the absolute value of the difference between $a_c$ and a is smaller than t, the threshold value setting unit 29 sets a value obtained by adding $y_x$ to $(c_{all}-c_0)/2$ or a value obtained by subtracting $y_x$ from $(c_{all}-a_0)/2$ to c and instructs the node 10 to execute the process (Step S17). Here, x is the number of times Step S17 is executed. In addition, $y_x$ is $(c_{all}-c_0)/2^{x+1}$. For example, $y_1$ is $(c_{all}-c_0)/2^2$ and $y_2$ is $(c_{all}-c_0)/2^3$. In addition, the threshold value setting unit 29 sets a value obtained by adding $y_x$ to $(c_{all}-c_0)/2$ to c when $a \geq a_c$, and sets a value obtained by subtracting $y_x$ from $(c_{all}-c_0)/2$ to c when $a<a_c$. Then, the threshold value setting unit 29 returns to Step S15.

On the other hand, when the absolute value of the difference between $a_c$ and a is not smaller than t, the threshold value setting unit 29 determines c with a current value (Step S18).

As described above, since the threshold value setting unit 29 determines the threshold value c, the AC unit 20 may optimize the AC parallelization function. Note that, the processing illustrated in FIG. 7 may be performed by the external device of the AC unit 20, and the AC unit 20 may receive the threshold value c determined by the external device.

Figure 8:
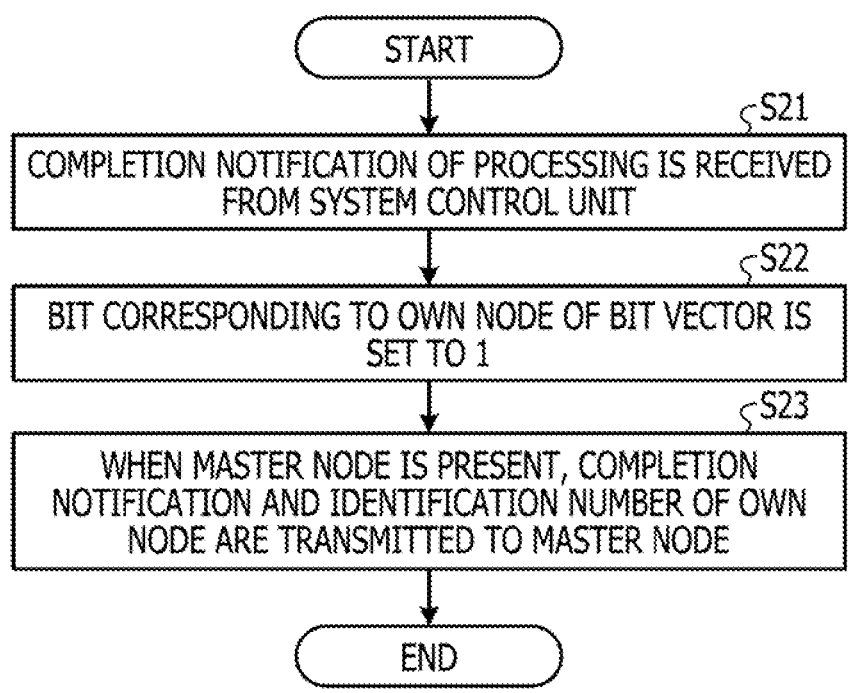
FIG. 8 is a flowchart illustrating a flow of notification processing when an own node completes processing.

Next, the processing flow of the AC unit 20 will be described with reference to FIGS. 8 to 11. FIG. 8 is a flowchart illustrating a flow of notification processing when the own node 10 completes the processing. As illustrated in FIG. 8, when the transfer processing unit 23 receives the completion notification of the processing from the system control unit 14 (Step S21), the transfer processing unit 23 sets the bit corresponding to the own node 10 of the bit vector to 1 (Step S22). Then, when the master node 10 is present, the transfer processing unit 23 transmits a completion notification and the identification number of the own node 10 to the master node 10 (Step S23).

As described above, since the transfer processing unit 23 transmits the completion notification and the identification number of the own node 10 to the master node 10, the master node 10 may be notified that the processing of the own node 10 is completed.

Figure 9:
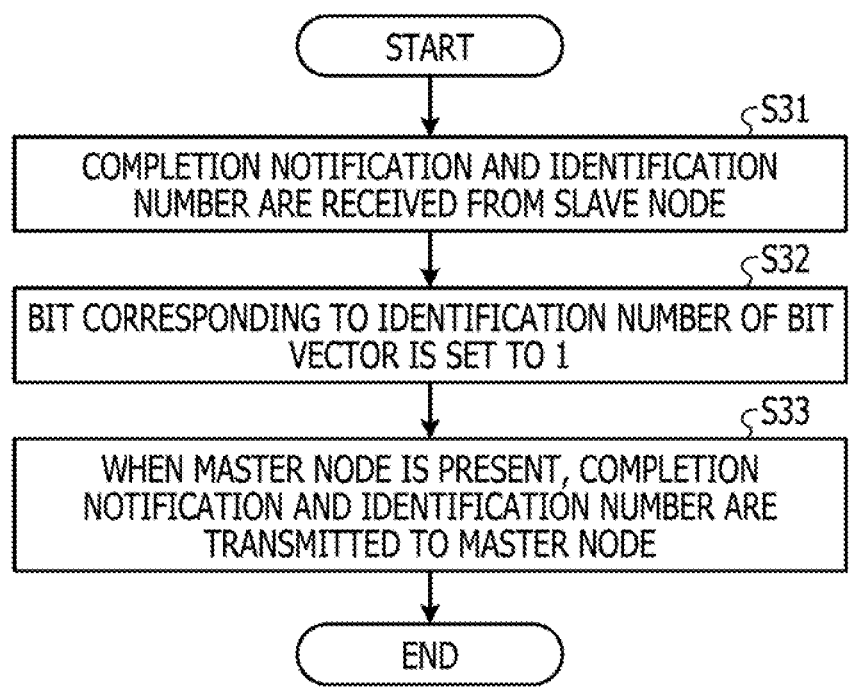
FIG. 9 is a flowchart illustrating a flow of transfer processing when a completion notification is received from a slave node.

FIG. 9 is a flowchart illustrating a flow of the transfer processing when the completion notification is received from the slave node 10. As illustrated in FIG. 9, when receiving the completion notification and the identification number from the slave node 10 (Step S31), the transfer processing unit 23 sets the bit corresponding to the identification number of the bit vector to 1 (Step S32). Then, when the master node 10 is present, the transfer processing unit 23 transmits a completion notification and an identification number to the master node 10 (Step S33).

As described above, since the transfer processing unit 23 transfers the completion notification and the identification number received from the slave node 10 to the master node 10, the root node 10 may specify the completion states of all the nodes 10.

Figure 10:
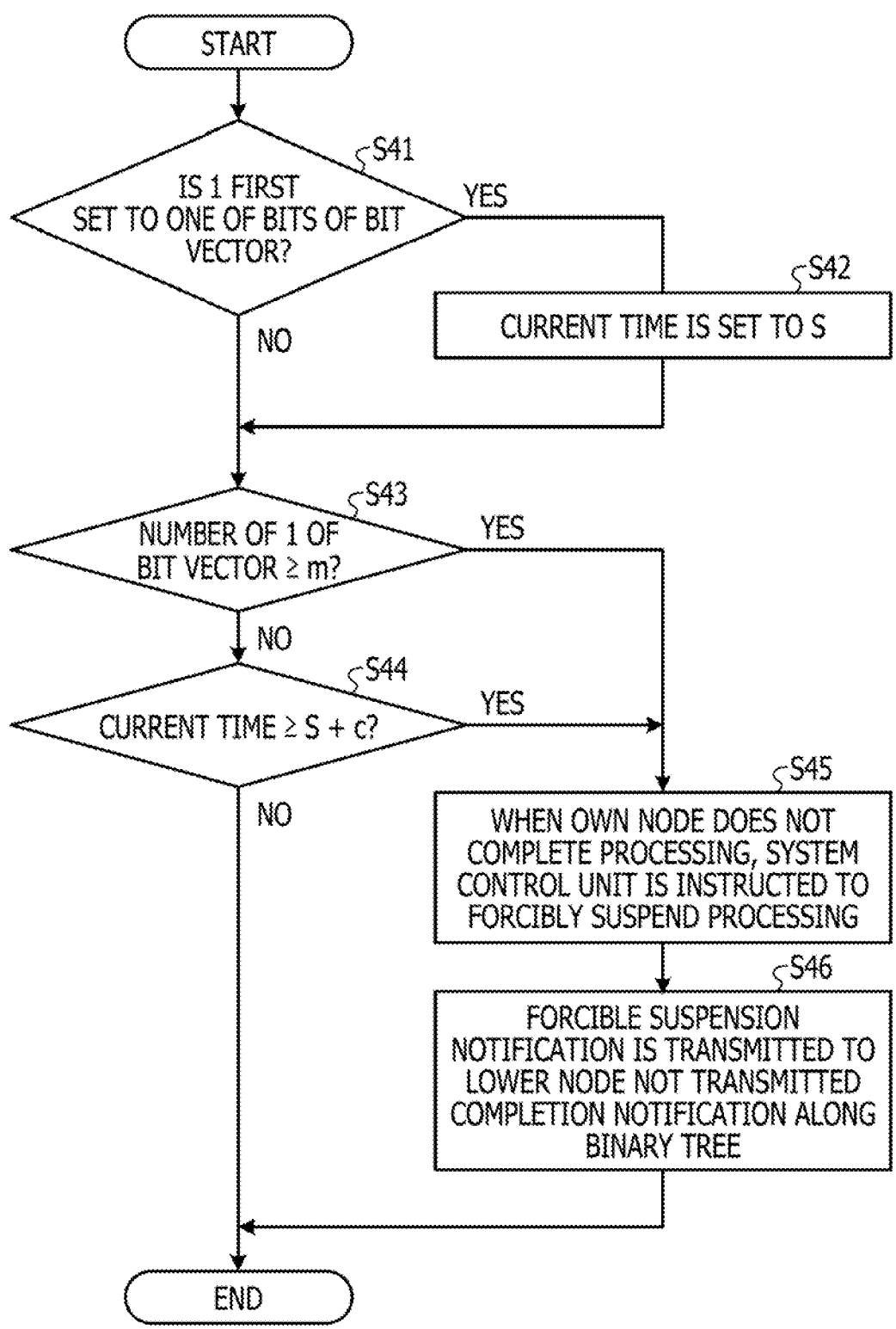
FIG. 10 is a flowchart illustrating a flow of processing by a determination unit when mode=1.

FIG. 10 is a flowchart illustrating the flow of the AC parallelization processing by the determination unit 26 when mode=1. Note that, the AC parallelization processing in FIG. 10 is started when 1 is set to one of the bits of the bit vector and is periodically started.

As illustrated in FIG. 10, the determination unit 26 determines whether or not 1 is first set to one of the bits of the bit vector (Step S41), and when 1 is first set, the determination unit 26 sets the current time to S (Step S42).

Then, the determination unit 26 determines whether or not the number of 1 of the bit vector is m or greater (Step S43), and when the number of 1 of the bit vector is not m or greater, determines whether or not the current time is (S+c) or longer (Step S44). Then, when the current time is not (S+c) or longer, the determination unit 26 ends the AC parallelization processing.

On the other hand, when the current time is (S+c) or longer or when the number of 1 of the bit vector is m or greater, the determination unit 26 instructs the system control unit 14 to forcibly suspend the processing when the own node 10 does not complete the processing (Step S45). Then, the determination unit 26 transmits a forcible suspension notification to the lower node 10 not transmitted the completion notification along the binary tree (Step S46).

As described above, when the number of 1 of the bit vector is m or greater or the current time is (S+c) or longer, the determination unit 26 forcibly suspends the processing for the node 10 in which processing is not completed. Therefore, the AC unit 20 may reduce the latency time in the barrier synchronization.

Figure 11:
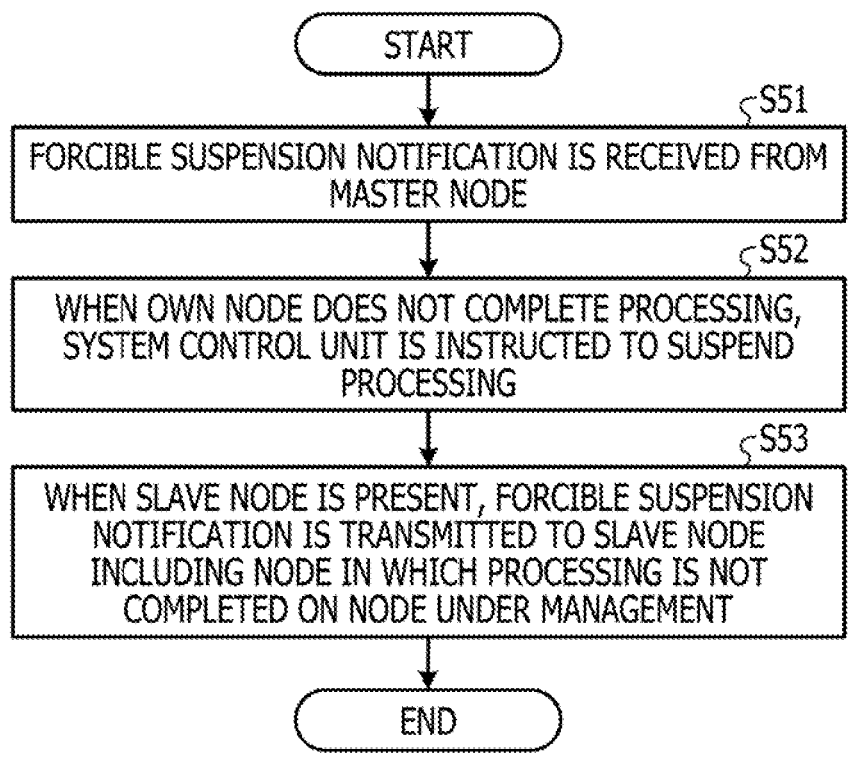
FIG. 11 is a flowchart illustrating a flow of transfer processing when a forcible suspension notification is received from a master node.

FIG. 11 is a flowchart illustrating the flow of the transfer processing when the forcible suspension notification is received from the master node 10. As illustrated in FIG. 11, when the transfer processing unit 23 receives the forcible suspension notification from the master node 10 (Step S51), and when the own node 10 does not complete the processing, the transfer processing unit 23 instructs the system control unit 14 to forcibly suspend the processing (Step S52). Then, when the slave node 10 is present, the transfer processing unit 23 transmits a forcible suspension notification to the slave node 10 including the node 10 in which processing is not completed on the node 10 under management (Step S53).

As described above, since the transfer processing unit 23 transfers the forcible suspension notification received from the master node 10 to the slave nodes 10 including the node 10 in which processing is not completed on the node 10 under management, the node 10 in which processing is not completed may receive the forcible suspension notification.

Figure 12:
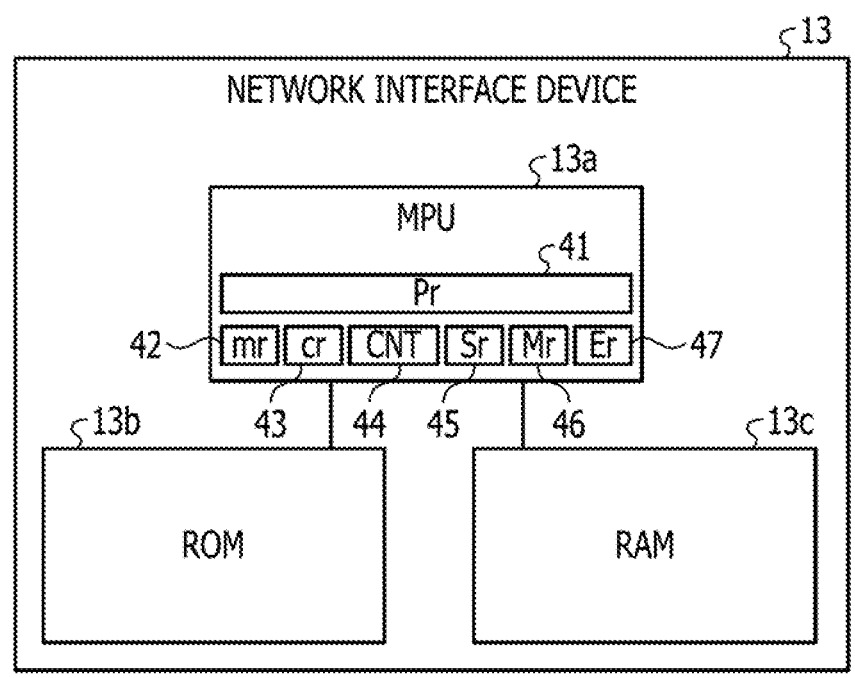
FIG. 12 illustrates an example of a hardware configuration of a network interface device.
Figure 13:
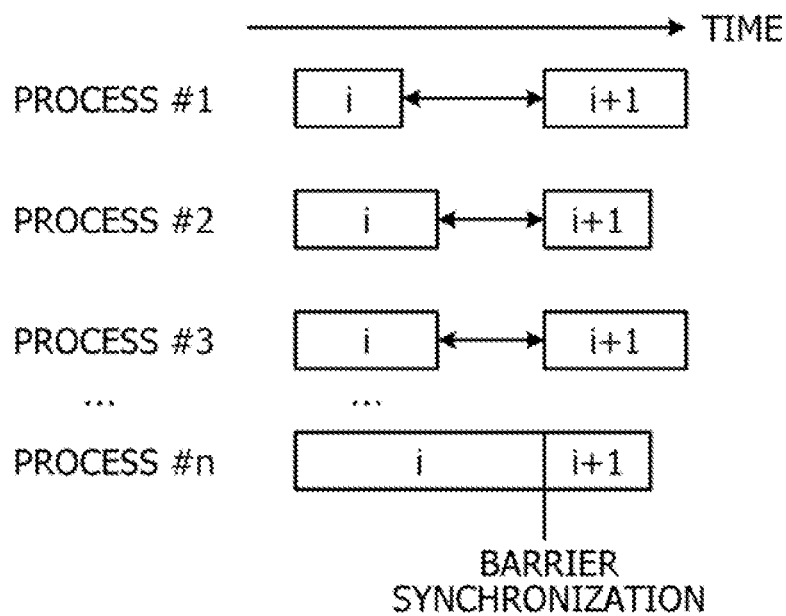
FIG. 13 is a diagram for describing barrier synchronization.
Figure 14:
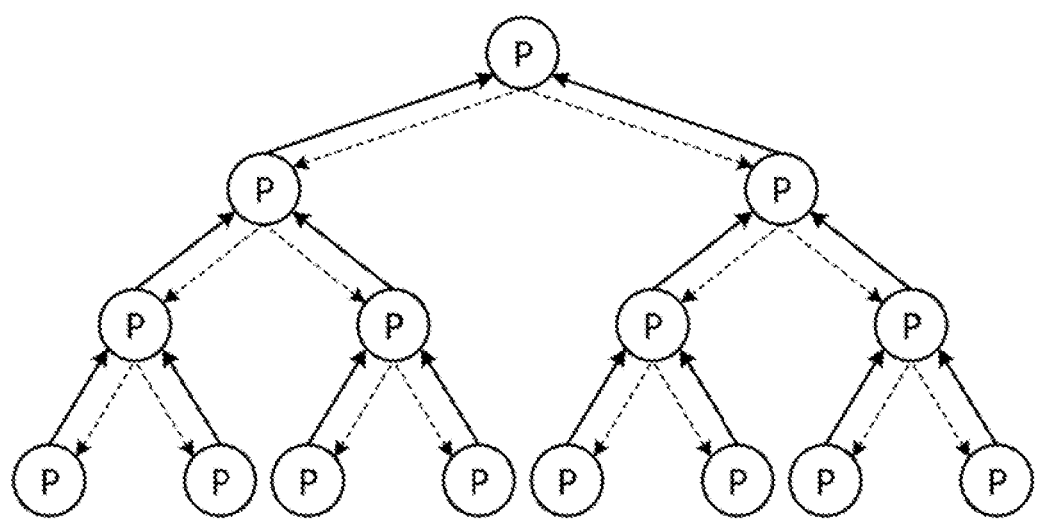
FIG. 14 is a diagram for describing communication between information processing apparatuses in the barrier synchronization.

Next, an example of a hardware configuration of the network interface device 13 will be described. FIG. 12 illustrates an example of the hardware configuration of the network interface device 13. As illustrated in FIG. 12, the network interface device 13 includes a microprocessor unit (MPU) 13a, a read-only memory (ROM) 13b, and a RAM 13c.

The MPU 13a is a processing device that reads and executes firmware (program) stored in the ROM 13b. The ROM 13b is a nonvolatile storage device that stores firmware. The RAM 13c is a storage device that stores data used by the firmware.

The MPU 13a includes Pr 41, mr 42, cr 43, CNT 14, Sr 45, Mr 46, and Er 47. Pr 41 is a register for storing a bit vector. The status storage unit 21 is realized by Pr 41. mr 42 is a register for storing the threshold value m. cr 43 is a register for storing the threshold value c. The threshold value storage unit 25 is realized by mr 42 and cr 43. CNT 44 counts time. Sr 45 is a register for storing the time s. Mr 46 is a register for storing the time $m_r$. Er 47 is a register for storing the time e. The time storage unit 27 is realized by Sr 45, Mr 46, and Er 47.

As described above, in the example, each node 10 stores the bit vector. Then, when the mode is 1, the first determination unit 26a of the root node 10 compares the number of nodes 10 completed the processing with the threshold value m based on the bit vector, and determines whether or not the number of nodes 10 completed the processing is the threshold value m or greater. Then, when the number of nodes 10 completed the processing is the threshold value m or greater, the suspension instruction unit 26c specifies a node 10 in which processing is not completed based on the bit vector and instructs the specified node 10 to forcibly suspend. Therefore, the AC unit 20 may reduce the latency time in the barrier synchronization and improve the processing speed.

In addition, in the example, when the mode is 1, the second determination unit 26b of the root node 10 detects a point of time at which one of the nodes 10 first completes the processing based on the bit vector, and determines whether or not an elapsed time from the detected point of time is the threshold value c or longer. Then, when the elapsed time since one of the nodes 10 first completes the processing is the threshold value c or longer, the suspension instruction unit 26c specifies the node 10 in which processing is not completed based on the bit vector, and instructs the specified node 10 to forcibly suspend. Therefore, the AC unit 20 may reduce the latency time in the barrier synchronization and improve the processing speed.

In addition, in the example, when the specified node 10 includes the own node 10, the suspension instruction unit 26c instructs the system control unit 14 to forcibly suspend the process. In addition, when the specified node 10 includes another node 10, the suspension instruction unit 26c refers to the bit vector and transmits a forcible suspension notification to the slave node 10 including the specified node 10 under the management. Then, in the slave node 10 receiving the forcible suspension notification, the transfer processing unit 23 refers to the bit vector and instructs the system control unit 14 to forcibly suspend the process when the own node 10 does not complete the processing. In addition, when the slave node 10 is present, the transfer processing unit 23 refers to the bit vector and transfers the forcible suspension notification to the slave node 10 including the node 10 in which processing is not completed on the node 10 under management. Therefore, the suspension instruction unit 26c may instruct the node 10 in which processing is not completed to forcibly suspend.

In addition, in the example, the AC unit 20 performs normal barrier synchronization when the mode is 0, performs AC parallelization when the mode is 1 and collects data for AC parallelization when the mode is 2. Therefore, the user may control the operation of the AC unit 20 by designating the mode by the program.

In addition, in the example, the threshold value storage unit 25 stores the threshold value m and the threshold value c, and the threshold value setting unit 29 determines the optimum values of the threshold value m and the threshold value c and stores the optimum values in the threshold value storage unit 25. Then, the first determination unit 26a compares the threshold value m stored in the threshold value storage unit 25 with the number of nodes 10 completed the processing, and the second determination unit 26b compares the threshold value c stored in the threshold value storage unit 25 with the elapsed time since one of the nodes 10 first completes the processing. Therefore, the AC unit 20 may optimize the AC parallelization function.

In addition, in the example, the process storage unit 28 stores the forcible suspension process number in association with the number of times of barrier synchronization, and the process reading unit 31 reads and outputs the forcible suspension process number and the number of times from the process storage unit 28. Therefore, the AC unit 20 may provide information useful for analysis of the AC parallelization function.

In addition, in the example, since the suspension instruction unit 26c transmits the estimated value of the processing result of the process to the process instructed to be forcibly suspended, the AC unit 20 may provide the AC parallelization function without reducing the number of processes.

In addition, in the example, the time storage unit 27 stores the time s, the time $m_t$, and the time e, and the time reading unit 30 reads and outputs the time s, the time $m_t$, and the time e from the time storage unit 27. Therefore, the AC unit 20 may provide information useful for analysis of the AC parallelization function.

Note that, in the example, the case where the process is allocated to the node 10 is described, and instead of the process, another processing unit such as a thread may be allocated to the node 10.

In addition, in the example, the case where both the first determination unit 26a and the second determination unit 26b operate when the mode is 1 is described, and the case where the mode is 1 may be subdivided. In other words, it is also possible to provide three modes of a mode in which only the first determination unit 26a operates, a mode in which only the second determination unit 26b operates, and a mode in which both the first determination unit 26a and the second determination unit 26b operate.

In addition, in the example, the case where the binary tree is configured for synchronous communication is described, and the node 10 may configure another tree structure for synchronous communication.

In addition, in the example, all the nodes 10 include the threshold value storage unit 25, the determination unit 26, the time storage unit 27, the process storage unit 28, the threshold value setting unit 29, the time reading unit 30, and the process reading unit 31, and only the root node 10 may include these functional units.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A barrier synchronization system comprising:
  a plurality of information processing apparatuses configured to perform parallel execution of respective processes, the parallel execution of each process by a respective information processing apparatus being synchronized by barrier synchronization, the plurality of information processing apparatuses connected to each other via a computing network, and each information processing apparatus configured to be one of a plurality of nodes in a tree structure and connected to one or more of other nodes from among the plurality of nodes,
  wherein each of the plurality of information processing apparatuses includes:
    a completion information storage; and
    a control circuit,
  wherein the completion information storage of each respective information processing apparatus is configured to store its own completion status of executing its respective process and the completion statuses of all information processing apparatuses executing their respective processes that are (i) lower than the respective information processing apparatus in the tree structure and (ii) either directly connected to the respective information processing apparatus or indirectly connected to the respective information processing apparatus through one or more intervening nodes in the tree structure, wherein a root node located by itself in a root level of the tree structure is the highest node, wherein the control circuit of the information processing apparatus operating as the root node is configured to:
obtain the completion statuses of all of the of nodes in the tree structure;
determine that a number of the obtained completion statuses indicating completed execution of respective processes is equal to a predetermined threshold, wherein the predetermined threshold is less than the total number of information processing apparatuses and greater than zero;
in response to the determination, identify all of the information processing apparatuses that have not completed execution of their respective processes based on their respective completion statuses; and
instruct the identified information processing apparatuses to forcibly suspend execution of their respective processes prior to the respective processes completing execution, wherein the identified information processing apparatuses forcibly suspend execution of their respective processes prior to the respective processes completing execution in response to receiving the instruction.

2. The barrier synchronization system according to claim 1, wherein the control circuit of the root node is further configured to:
detect, based on its own completion information storage, a point of time at which one of the information processing apparatuses first completes execution before any of the other information processing apparatuses completes execution;
determine whether an elapsed time from the detected point of time to a current point in time is equal to or greater than a second threshold value; and
in response to determining that the number is equal to the predetermined threshold and the elapsed time is equal to or greater than the second threshold value, identify all of the information processing apparatuses that have not completed execution of their respective process based on their respective completion statuses.

3. The barrier synchronization system according to claim 1, wherein the control circuit of the root node is in response to determining that the number is equal to the predetermined threshold further configured to:
instruct the root node to forcibly suspend the execution of its own respective process when its respective completion status indicates that it has not completed execution of its respective process; and
transmit a forcible suspension notification to all of the nodes in the next adjacent lower level of the tree structure, and
the control circuit of each of the nodes in the next adjacent lower level is configured to:
in response to receiving the forcible suspension notification, refer to its own completion information storage;
forcibly suspend the execution of its respective process when its respective completion status indicates that it has not completed execution of its respective process; and
transmit, the forcible suspension notification to all of the nodes in the next adjacent lower level of the tree structure that are either directly connected to the respective information processing apparatus or indirectly connected to the respective information processing apparatus through one or more intervening nodes.

4. The barrier synchronization system according to claim 1, wherein the control circuit of the root node is further configured to perform a determination by using a value indicating a mode, the mode corresponding to a barrier synchronization operation to be performed in the barrier synchronization system.

5. The barrier synchronization system according to claim 1, wherein the control circuit of the root node is further configured to:
adjust the predetermined threshold; and
perform the determining by using the adjusted predetermined threshold.

6. The barrier synchronization system according to claim 1, wherein the control circuit of the root node is further configured to:
store an identifier of an information processing apparatus and the predetermined threshold, the identifier identifying one of the information processing apparatuses instructed to forcibly suspend its execution; and
read and output the stored identifier and the predetermined threshold.

7. The barrier synchronization system according to claim 1, wherein the instructing further includes transmitting an expected execution result of the respective process for each of the identified information processing apparatuses over the computing network, the expected execution result being a result expected if the execution of the respective process were to be completed.

8. The barrier synchronization system according to claim 1, wherein the control circuit of the root node is further configured to:
store a plurality of times in its completion information storage including a first time, a second time, and a third time, the first time being a time at which at least one of the information processing apparatuses has first its execution before any of the other information processing apparatuses has completed executing, the second time being a time at which the number equals the predetermined threshold, and the third time being a time at which one or more of the plurality of information processing apparatuses has last completed executing after all of the other information processing apparatuses have previously completed execution; and
read and output any of the stored times.

9. A parallel information processing apparatus configured to perform parallel execution of a process while synchronizing its execution with other parallel information processing apparatuses executing respective processes in a barrier synchronization system by barrier synchronization, the parallel information processing apparatus and the other parallel information processing apparatuses connected to each other via a computing network, each of the plurality of parallel information processing apparatuses configured to be one of a plurality of nodes in a tree structure and connected to one or more of other nodes from among the plurality of nodes, the parallel information processing apparatus comprising:

a completion information storage; and a control circuit, wherein the completion information storage is configured to store its own completion status of executing its respective process and the completion statuses of all parallel information processing apparatuses executing their respective processes that are (i) lower than the respective parallel information processing apparatus in the tree structure and (ii) either directly connected to the respective parallel information processing apparatus or indirectly connected to the respective parallel information processing apparatus through one or more intervening nodes in the tree structure, wherein a root node located by itself in a root level of the tree structure is the highest node, and wherein the control circuit is configured to: when the parallel information processing apparatus is configured to be operated as the root node located in the root level in the tree structure, obtain the completion statuses of all of the of nodes in the tree structure;

determine that a number of the obtained completion statuses indicating completed execution of respective processes is equal to a predetermined threshold, wherein the predetermined threshold is less than the total number of parallel information processing apparatuses and greater than zero;

in response to the determination, identify all of the parallel information processing apparatuses that have not completed execution of their respective processes based on their respective completion statuses; and instruct the identified parallel information processing apparatuses to forcibly suspend execution of their respective processes prior to the respective processes completing execution, wherein the identified parallel information processing apparatuses forcibly suspend execution of their respective processes prior to the respective processes completing execution in response to receiving the instruction.

10. The parallel information processing apparatus according to claim 9, the control circuit is configured to:

detect, based on the its own completion information storage, a point of time at which one of the parallel information processing apparatuses first completes execution before any of the other parallel information processing apparatuses completes execution;

determine whether an elapsed time from the detected point of time to a current point in time is equal to or greater than a second threshold value; and in response to determining that the number is equal to the predetermined threshold and the elapsed time is equal to or greater than the second threshold value, identify all of the parallel information processing apparatuses that have not completed execution of their respective process based on their respective completion statuses.

11. A non-transitory computer-readable storage medium for storing a barrier synchronization program which when executed by a processor of a parallel information processing apparatus causes the parallel information processing apparatus to synchronize execution of a process, the parallel information processing apparatus being one of a plurality of parallel information processing apparatuses connected to each other via a computing network, the parallel information processing apparatus being configured to synchronize execution of its process with other parallel information processing apparatuses executing respective processes by barrier synchronization, each of the plurality of parallel information processing apparatuses being configured to be one of a plurality of nodes in a tree structure and connected to one or more of other nodes from among the plurality of nodes, when the parallel information processing apparatus is configured to be operated as a root node located in a root in the tree structure, accessing a completion information storage, the completion information storage being configured to store a completion status of the root node executing its respective process and the completion statuses of all parallel information processing apparatuses executing their respective processes in the tree structure, obtaining the completion statuses of all of the nodes in the tree structure;

determining that a number of the obtained completion statuses indicating completed execution of respective processes is equal to a predetermined threshold, wherein the predetermined threshold is less than the total number of parallel information processing apparatuses and greater than zero;

in response to the determining, identify all of the parallel information processing apparatuses that have not completed execution of their respective processes based on their respective completion statuses; and instructing the identified parallel information processing apparatuses to forcibly suspend execution of their respective processes prior to the respective processes completing execution, wherein the identified parallel information processing apparatuses forcibly suspend execution of their respective processes prior to the respective processes completing execution in response to receiving the instruction.

12. The non-transitory computer-readable storage medium according to claim 11, when the parallel information processing apparatus is configured to be operated as the root node further:

detecting, based on the completion information storage, a point of time at which one of the parallel information processing apparatuses first completes execution before any of the other parallel information processing apparatuses completes execution;

determining whether an elapsed time from the detected point of time to a current point in time is equal to or greater than a second threshold value; and in response to determining that the number is equal to the predetermined threshold and the elapsed time is equal to or greater than the second threshold value, identify all of the parallel information processing apparatuses that have not completed execution of their respective process based on their respective completion statuses.

* * * * *